US009264611B2

(12) United States Patent
Abe

(10) Patent No.: US 9,264,611 B2
(45) Date of Patent: Feb. 16, 2016

(54) IMAGE-PICKUP APPARATUS, ITS CONTROL METHOD, AND STORAGE MEDIUM

(71) Applicant: CANON KABUSHIKI KAISHA, Tokyo (JP)

(72) Inventor: Takahiro Abe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 380 days.

(21) Appl. No.: 13/948,475

(22) Filed: Jul. 23, 2013

(65) Prior Publication Data

US 2014/0028792 A1    Jan. 30, 2014

(30) Foreign Application Priority Data

Jul. 27, 2012  (JP) ................................ 2012-167788
Jun. 14, 2013  (JP) ................................ 2013-125342

(51) Int. Cl.
| H04N 5/77 | (2006.01) |
| H04N 9/80 | (2006.01) |
| H04N 5/232 | (2006.01) |
| H04N 5/235 | (2006.01) |
| H04N 5/345 | (2011.01) |

(52) U.S. Cl.
CPC ......... *H04N 5/23238* (2013.01); *H04N 5/2354* (2013.01); *H04N 5/23219* (2013.01); *H04N 5/23222* (2013.01); *H04N 5/23274* (2013.01); *H04N 5/3452* (2013.01)

(58) Field of Classification Search
None
See application file for complete search history.

(56) References Cited

U.S. PATENT DOCUMENTS

| 2005/0179810 | A1* | 8/2005 | Okamura ...................... 348/371 |
| 2006/0067667 | A1* | 3/2006 | Kita ............................. 396/180 |
| 2012/0044379 | A1* | 2/2012 | Manabe ..................... 348/222.1 |

FOREIGN PATENT DOCUMENTS

JP          2010-028764 A     2/2010

* cited by examiner

*Primary Examiner* — Hung Dang
(74) *Attorney, Agent, or Firm* — Cowan, Liebowitz & Latman, P.C.

(57) ABSTRACT

An image-pickup apparatus includes a synthesizer configured to synthesize a plurality of images, a detector configured to detect positional information, a first instructor configured to instruct a start of a photography preparing operation, a second instructor configured to instruct a start of a photographic operation, and a controller configured to determine first and second capturing conditions in accordance with an instruction from the first instructor and to hold reference position information based upon the positional information when the first instructor provides an instruction, the controller being configured to make an image-pickup unit start the consecutive shooting under the first capturing condition in accordance with an instruction from the second instructor, and to make the image-pickup unit capture an image under the second capturing condition when the detector detects that the positional information of the image-pickup apparatus corresponds to the reference position information.

11 Claims, 6 Drawing Sheets

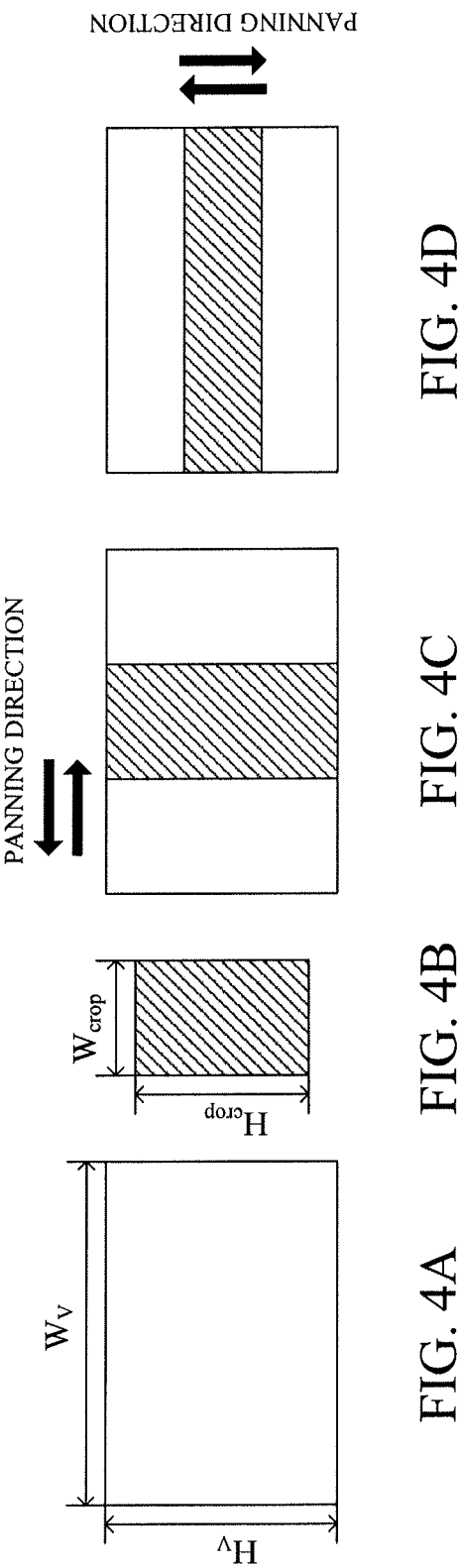

IMAGE-PICKUP APPARATUS, ITS CONTROL METHOD, AND STORAGE MEDIUM

BACKGROUND OF THE INVENTION

1. Field of the Invention

The present invention relates generally to consecutive shooting during panning using an image-pickup apparatus, and more particularly to a method for changing an image-pickup condition during consecutive shooting.

2. Description of the Related Art

Japanese Patent Laid-Open No. ("JP") 2010-28764 proposes a method for consecutively capturing still images during panning and for generating a panoramic image by synthesizing the consecutively captured still images. This method will be referred to as panning panoramic synthesizing hereinafter.

However, the capturing method disclosed in JP 2010-28764 cannot properly capture an object and a background simultaneously when the object is dark and/or moving in a range of the panoramic image pickup.

SUMMARY OF THE INVENTION

With the foregoing in mind, the present invention provides an image-pickup apparatus configured to generate a high-quality synthesized image in panning panoramic synthesis.

An image-pickup apparatus according to the present invention is configured to provide consecutive shooting. The image-pickup apparatus includes an image-pickup unit configured to capture an object image, a synthesizer configured to synthesize a plurality of images captured by the image-pickup unit, a detector configured to detect positional information of the image-pickup apparatus, a first instructor configured to instruct a start of a photography preparing operation, a second instructor configured to instruct a start of a photographic operation, and a controller configured to determine a first capturing condition and a second capturing condition in accordance with an instruction from the first instructor and to hold reference position information based upon the positional information detected by the detector when the first instructor provides an instruction, the controller being configured to make the image-pickup unit start the consecutive shooting under the first capturing condition in accordance with an instruction from the second instructor, and to make the image-pickup unit capture an image under the second capturing condition when the detector detects that the positional information of the image-pickup apparatus corresponds to the reference position information.

Further features of the present invention will become apparent from the following description of exemplary embodiments with reference to the attached drawings.

BRIEF DESCRIPTION OF THE DRAWINGS

FIGS. 4A-4D illustrate panning directions and cutout areas in images according to the first embodiment of the present invention.

DESCRIPTION OF THE EMBODIMENTS

A description will now be given of circumstances of the invention, problems of this embodiment, and characteristics of this embodiment. Assume a panoramically synthesized image that includes an image captured with a light emission by a light emitter in the handheld photography, such as a panorama of the night view portrait, and a panorama of a scene of a backlit person in a daytime portrait. In the panoramically synthesized image, brightness of each of a main object which the emitted light reaches and a background which the emitted light does not reach is appropriately adjusted.

Figure 7A:
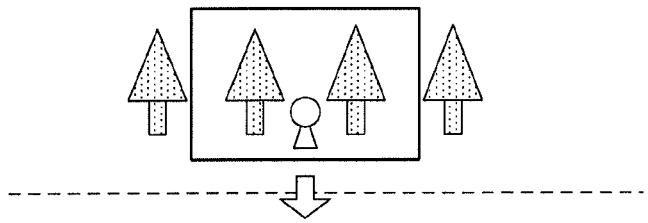
FIGS. 7A-7B illustrate a panoramically synthesized image made by continuously capturing an image captured with a light emission by a light emitter and then an image captured without the light emission by the light emitter.
Figure 7B:
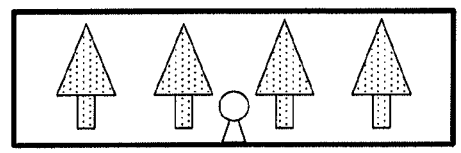

As a method of synthesizing this synthesized image, assume an image synthesizing method of synthesizing an image captured with a light emission by a light emitter as illustrated in FIG. 7A, and an image continuously captured without the light emission by the light emitter as illustrated in FIG. 7B.

In the consecutive shooting during panning, the position of the object may be the same as the position of the image captured with the light emission by the light emitter. However, the panning causes a positional offset in a direction perpendicular to the panning direction or rolling or flapping of the digital camera, and shooting with the maintained object position is difficult. As a result, the synthesized image becomes degraded in comparison with the image with the maintained object position.

Next follows a method for synthesizing images with flashlight while still images are being consecutively shot during panning.

In consecutively shooting still images during panning, lighting a flashbulb for each of all shorts is not realistic for a built-in flash of a digital camera widespread in the market due to a charging speed of an electrolytic capacitor, and a dedicated flash is necessary. In addition, closing of eyes of a person as a main object is worried due to a plurality of flashes. For these reasons, a capturing method with flashlight once is realistic.

When a user presses a switch so as to instruct a flash shooting timing during panning, the switching timing may delay due to the panning and a flashing position may shift from the desired panning position. In addition, the digital camera may be blurred by the switching operation.

It is therefore necessary to provide flash photography at a desired position in the consecutive shooting during panning. The flash photography is different in white balance from the non-flash photography in addition to the flash. In other words, it is necessary to change a shooting condition at a desired position in the consecutive shooting during panning.

First Embodiment

Accordingly, the first embodiment of the present invention provides flash photography at a first shooting instruction position (desired position) in the consecutive shooting during panning in the panning panoramic synthesizing processing configured to generate a panoramic image of the night view portrait. A detailed description of a preferred embodiment of the present invention will be given with reference to the accompanying drawings.

Figure 1:
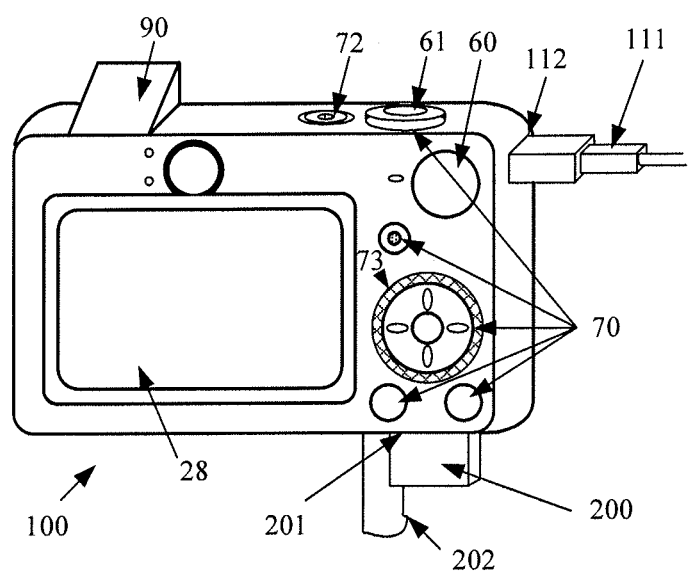
FIG. 1 is a schematic view of a rear overview of an image-pickup apparatus according to this embodiment of the present invention.

FIG. 1 illustrates an overview of a digital camera 100 as an illustrative image-pickup apparatus according to the present invention. This embodiment is directed to a digital camera as an image-pickup apparatus but the present invention is not limited to this embodiment and is applicable to a television camera. A display unit 28 is a display unit configured to display an image and various information. A shutter button 61 is an operating unit for a capturing instruction. A mode switch 60 is an operating unit configured to switch to one of various modes. A connector 112 is a connector between a connection cable 111 and the digital camera 100. An operating unit 70 is an operating unit that includes manipulating members such as a switch, a button, and a touch panel, configured to accept various operations from a user. A controller wheel 73 is a rotatable operation member included in the operating unit 70. A power switch 72 is a switch configured to turn on and off the power. A flash 90 (light emitter) is a flashing unit configured to emit light by discharging electric charges accumulated in the electrolytic capacitor in the flash photography. A recording medium 200 is a recording medium, such as a memory card and a hard disk. A recording medium slot 201 is a slot configured to store the recording medium 200. The recording medium 200 stored in the recording medium slot 201 can communicate with the digital camera 100. A lid 202 is a lid for the recording medium slot 201.

Figure 2:
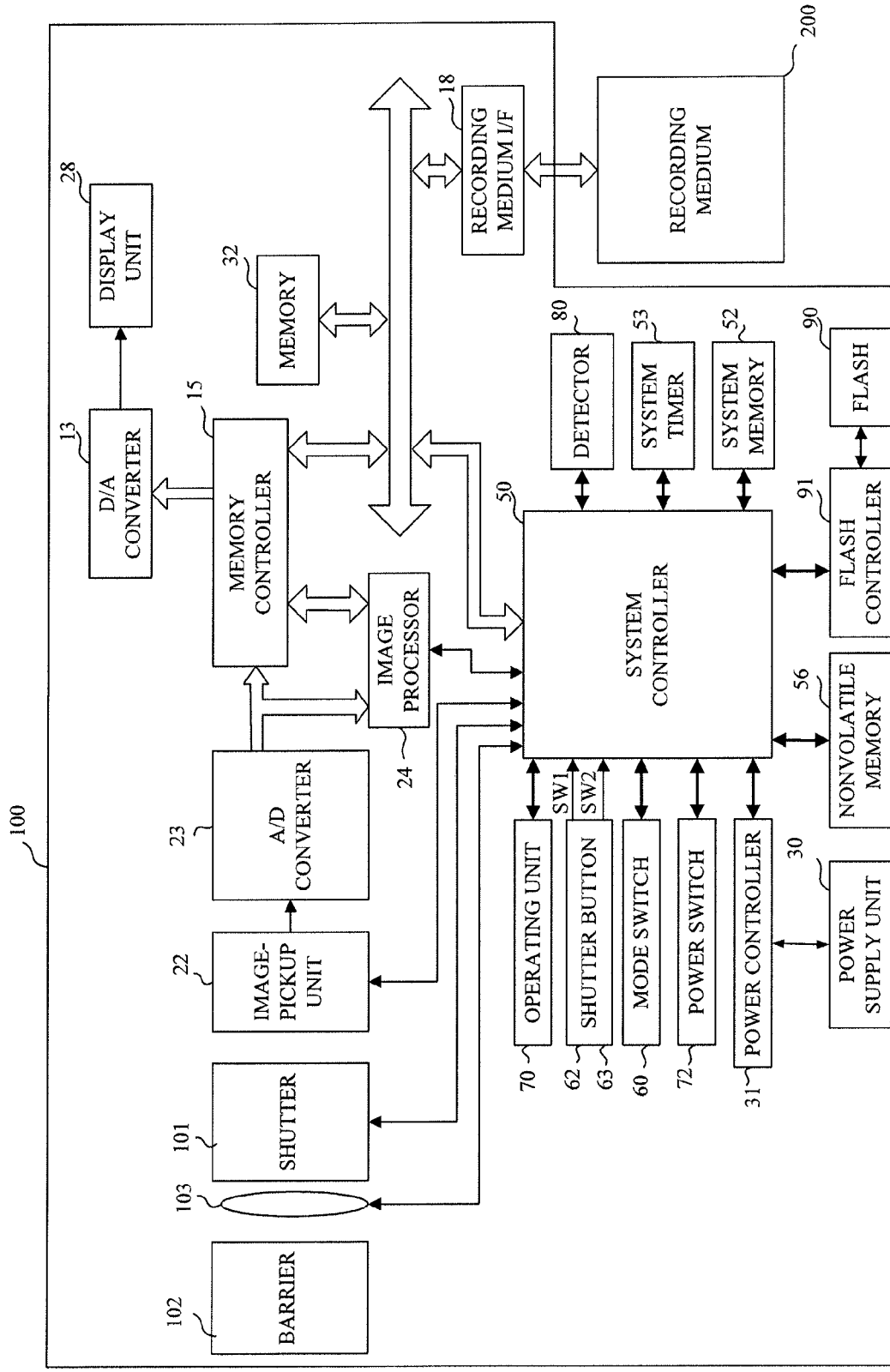
FIG. 2 is a block diagram of a structure of the image-pickup apparatus according to this embodiment of the present invention.

FIG. 2 is a block diagram illustrating an illustrative configuration of the digital camera 100 according to this embodiment.

An image-pickup lens 103 is a lens unit in FIG. 2 including a zoom lens and a focus lens. A shutter 101 is a shutter that serves as a diaphragm. An image-pickup unit 22 includes an image sensor, such as a CCD element and a CMOS element, configured to photoelectrically convert an object image (optical image) formed by the lens 103 and to generate an image signal. An A/D converter 23 converts an analogue signal output from the image-pickup unit 22 into a digital signal. A barrier 102 covers the image-pickup system that includes the image-pickup lens 103 of the digital camera 100 and prevents the image-pickup system including the image-pickup lens 103, the shutter 101, and the image-pickup unit 22 from contaminating or breaking.

An image processor 24 performs color conversion processing and resizing processing such as prescribed pixel interpolating and reducing, for data from the A/D converter 23 or data from a memory controller 15. In addition, the image processor 24 performs predetermined operating processing using captured image data, and a system controller 50, which will be described later, controls the exposure, focus detections, AF, etc. of the obtained operation result. More specifically, the system controller 50, which will be described later, provides TTL (through-the-lens) AF (autofocus) processing, AE (automatic exposure) processing, flashlight adjusting processing, and pre-flashing processing. In addition, the system controller 50 provides TTL AWB (automatic white balance) processing. Moreover, the system controller 50 performs processing of synthesizing a plurality of images as well as panoramically synthesizing processing.

Output data from the A/D converter 23 is directly written in the memory 32 via the image processor 24 and the memory controller 15 or via the memory controller 15. The memory 32 stores image data obtained by the image-pickup unit 22 and converted into digital data by the A/D converter 23, and image data to be displayed by the display unit 28. The memory 32 has a storage capacity enough to store the predetermined number of still images, a motion image and voices for a predetermined time period.

The memory 32 serves as a (video) memory configured to display an image. A D/A converter 13 converts data used to display an image stored in the memory 32 into an analogue signal, and supplies it to the display unit 28. Thus, the image data used to display an image written in memory 32 is displayed by display unit 28 via the D/A converter 13. The display unit 28 displays the analogue signal from the D/A converter 13 on an indicator such as an LCD. The digital signal once A/D-converted by the A/D converter 23 and stored in the memory 32 is converted into the analogue signal by the D/A converter 13 and sequentially forwarded to the display unit 28 so as to achieve a function of an electronic viewfinder and to display a through-the-lens image.

A nonvolatile memory 56 is an electrically erasable and recordable memory, and may, for example, be an EEPROM. A constant, a program, etc. for the operation of the system controller 50 are stored in the nonvolatile memory 56. The program, as used herein, includes a program used to execute various flowcharts, which will be described later, according to this embodiment.

The system controller 50 (controller, synthesizer) controls the whole digital camera 100. Each processing of this embodiment described later is achieved by executing the program recorded in the nonvolatile memory 56. Reference numeral 52 denotes a system memory, and may use a RAM. Constants and variables used for the operation of system controller 50, a program read from the nonvolatile memory 56, etc., are developed in the system memory 52. The system controller 50 controls displaying by controlling the memory 32, the D/A converter 13, and the display unit 28, etc.

A system timer 53 is a time measuring unit configured to measure a time period used for a variety of controls, and a time period of a built-in clock.

Operating means used to input a variety of operational instructions to the system controller 50 includes a mode switch 60, a first shutter switch 62 (first instructor), a second shutter switch 63 (second instructor), and the operating unit 70.

The mode switch 60 switches an operational mode of the system controller 50 to one of a still image recording (capturing) mode and a motion image recording (capturing) mode, a reproducing mode, etc. The still image capturing mode contains an automatic capturing mode, an automatic scene determining mode, a manual mode, a variety of scene modes for a capturing setting of a different capturing scene, a program AE mode, and a custom mode, etc. The mode switch 60 directly switches to one of these modes in the still image capturing mode. Alternatively, the mode switch 60 once switches to the still image capturing mode and then another operating member may switch to one of the modes included in the still image capturing mode. Similarly, a plurality of modes may be included in the motion image capturing mode. The first shutter switch 62 turns on by operating the shutter button 61 halfway or half pressing the shutter button 61 provided to the digital camera 100 (photography preparing instruction) and generates a first shutter switch signal SW1. In response to the first shutter switch signal SW1, photographically preparatory processing starts, such as AF (autofocus) processing, AE (automatic exposure) processing, AWB (auto white balance) processing, flashlight adjusting processing, and pre-flashing processing.

The second shutter switch 63 turns on by completing the operation of the shutter button 61 or fully pressing the shutter button 61 (capturing instruction), and generates a second shutter switch signal SW2. In response to the second shutter switch signal SW2, the system controller 50 starts a series of operations from reading a signal from the image-pickup unit 22 to writing image data in the recording medium 200 or starts a capturing operation.

Each operating member in the operating unit is properly assigned a function of each scene arbitrarily by selecting various functional icons displayed in the display unit 28, etc., and serves as a functional button. A functional button includes, for example, an end button, a return button, an image feeding button, a jumping button, a refining button, an attribute changing button, etc. For example, when the menu button are pressed, the display unit 28 displays a menu screen in which a variety of settings can be made. The user can make a variety of settings intuitively by using the menu screen displayed on the display unit 28, four-direction or upper, lower, right, and left SET buttons.

The controller wheel 73 is a rotationally operating member included in the operating unit 70, and used with a direction button in instructing the selective items. When the controller wheel 73 is rotated, an electric pulsed signal is generated according to an operational amount and the system controller 50 controls each part of the digital camera 100 on the basis of this pulse signal. The controller wheel 73 can determine, based upon this pulsed signal, a rotated angle, the number of rotations, etc. The structure of the controller wheel 73 is not limited as long as it is an operating member configured to detect the rotational operation. For example, the controller wheel 73 may be a dial operating member configured to rotate in accordance with the rotational operation of the user, and generate a pulsed signal. The control wheel 73 may not rotate, and the operating member may be a touch sensor configured to detect the user's finger rotation on the controller wheel 73 etc. (so called touch wheel).

The power controller 31 includes a battery detecting circuit, a DC-DC converter, a switching circuit configured to switch an electrified block, etc., and detects whether or not the battery is attached, a type of the battery, and a battery's residue amount. The power controller 31 controls the DC-DC converter based upon the detection result and the instruction of the system controller 50, and supplies a necessary voltage to each part including the recording medium 200 for a necessary period.

The power supply unit 30 includes a primary battery, such as alkaline and lithium batteries, a secondary battery, such as NiCd, NiMH, and Li batteries, and an AC adaptor, etc. A recording medium I/F 18 is an interface with the recording medium 200, such as a memory card and a hard disk. The recording medium 200 is a recording medium, such as a memory card, configured to record a captured image, and it may include a semiconductor memory and a magnetic disk, etc.

The detector 80 includes a gyro detector configured to vibrate a device and to measure a Coriolis force, and an azimuth detector configured to measure an azimuth from the terrestrial magnetism. The system controller 50 detects an angular rate, an angle, and an azimuth of the digital camera 100 based upon the detection result of the detector 80. The system controller 50 calculates the angle from an integrated value by integrating an output value of the angle rate, for example, when the output of detector 80 is an angle rate. The system controller 50 calculates an image stabilizing amount of the digital camera 100 and the camera angle in the panning photography based upon the detection result of the detector 80.

A flash controller 91 controls an emitting timing for the flash 90 based upon the instruction from the system controller 50.

The digital camera 100 can capture an image using central one-point AF or face AF. The central one-point AF is AF on one point at the central point in the image screen. The face AF is AF on face(s) in the image screen detected by a face detector.

The face detector will be described. The system controller 50 sends image data for a face detection to the image processor 24. The image processor 24 applies a horizontal band-pass filter to the image data under control of the system controller 50. The image processor 24 applies a vertical band-pass filter to the processed image data under control of the system controller 50. The edge component is detected from the image data by the horizontal and vertical band-pass filters.

Afterwards, the system controller 50 executes pattern matching for the detected edge component, and extracts candidates of eyes, noses, mouths, and ears. The system controller 50 determines a pair of eyes which satisfies the preset condition(s) among the extracted eye candidates (such as a distance between two eyes and a slope) and refines the eye-pair candidates from the eye candidates. The system controller 50 detects the face by combining the refined eye candidate with other parts (nose, mouth, and ear) and by applying a preset non-face filter. The system controller 50 outputs face information according to the face detection result, and ends the processing. At this time, a characteristic amount, such as the number of faces and the size, is stored in the system memory 52.

The object information can be detected by analyzing the image data in the live-view display or reproduction display and by extracting the characteristic amount of the image data. While this embodiment illustrates face information as object information, other object information includes a red eye determination, an eye detection, a detection of closing of an eye, and a smile detection, etc. In addition, object information of the background includes an image-pickup scene, such as a night view scene, a night view portrait scene, and a backlight scene.

Face AE, face FE, and face WB may be performed with the face AF. The face AE optimizes the exposure of the entire screen according to the brightness of the detected face. The face FE adjusts flashlight at the center of the detected face. The face WB optimizes WB on the entire screen according to the color of the detected face.

Figure 3:
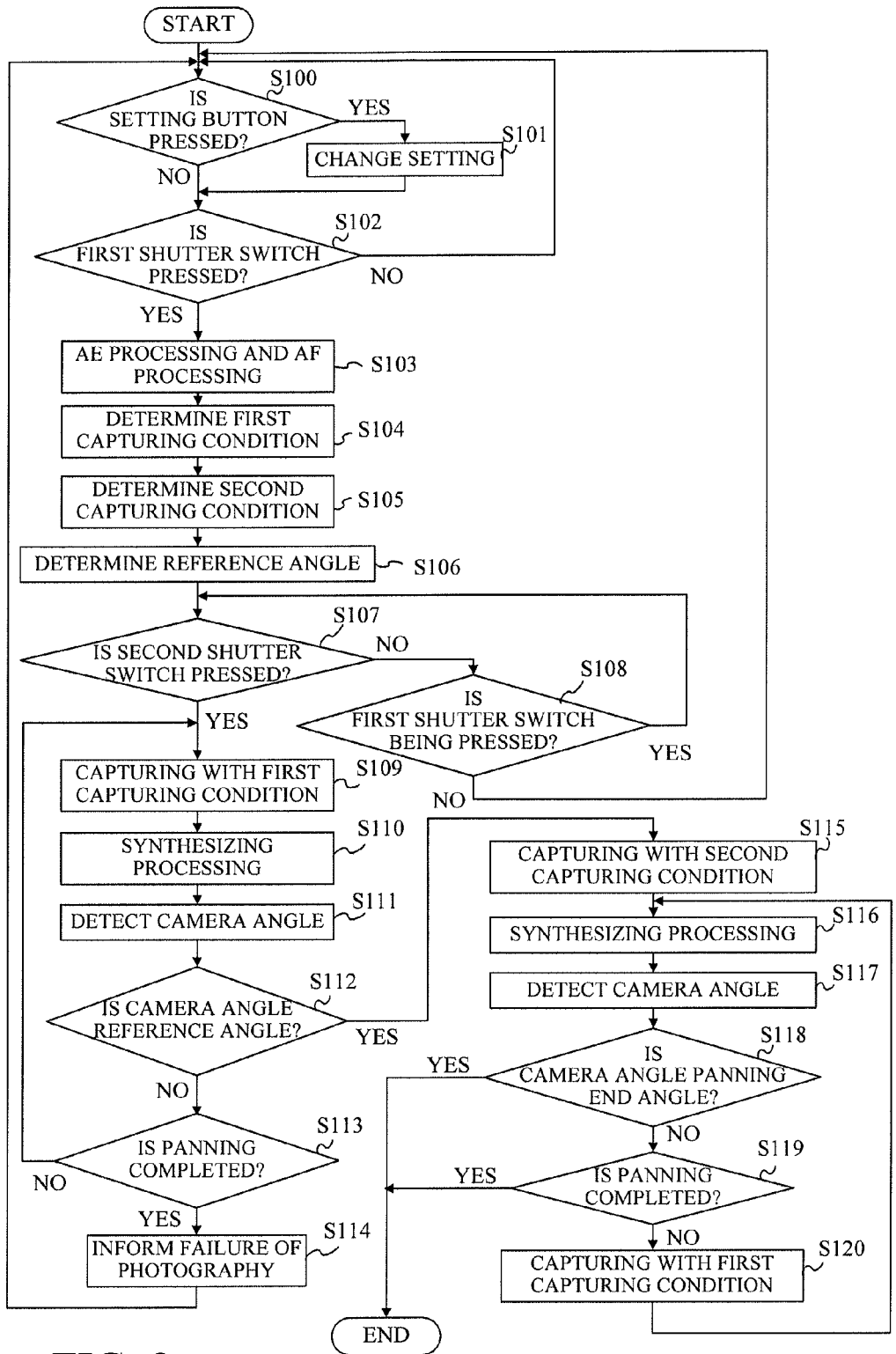
FIG. 3 is a flowchart of panning panoramic synthesiszing processing according to a first embodiment of the present invention.

FIG. 3 is a flowchart illustrating a processing flow according to this embodiment. The processing of FIG. 3 is executed when the mode switch 60 selects the panning panoramic synthesizing mode with flashlight at a first capturing instruction position. The system controller 50 mainly executes this processing in accordance with the computer program. This is true of another embodiment, which will be described later.

The system controller 50 determines whether a setting button of the operating unit 70 has been pressed (S100) and changes a photographic panning angle and a panning direction when determining that the setting button has been pressed (S101). The flow moves to processing of S102 when the system controller 50 determines that the setting button has not yet been pressed. An initial set value is used in the initial movement when the setting is not changed.

Next, the system controller 50 determines whether the first shutter switch 62 has been pressed (S102) and the flow moves to the processing of S103 when determining that the first shutter switch 62 has been pressed. The flow returns to the processing of S100 when the system controller 50 determines that the first shutter switch 62 has not yet been pressed.

Next, the system controller 50 performs AE processing and AF processing (S103). In this case, the pre-flashing processing may be performed.

Next, the system controller 50 determines the exposure, the photographic sensitivity, the existence of the light emission, a light emission amount etc. in the first and second capturing conditions based upon the AE processing result of S103 (S104, S105). In this embodiment, the first and second capturing conditions have the same exposure and the same photographic sensitivity. The first capturing condition uses no flashlight, and the second capturing condition uses flashlight so as to use different white balances. An image is captured at the lens position focused on the object in the AF processing of S103 in both first and second capturing conditions.

Next, the system controller 50 sets the position at which the first shutter switch 62 has been pressed to a reference angle of the digital camera 100 for the panning photography, and stores information of the reference angle in the system memory 52, etc. (S106). The reference angle of the digital camera 100 is set for each of the panning direction and the direction vertical to the panning direction.

Next, the system controller 50 determines whether the second shutter switch 63 has been pressed (S107).

When it is determined that the second shutter switch 63 has not been pressed in S107, the system controller 50 determines whether the first shutter switch 62 is being pressed or whether it is so-called half-pressing (S108).

When it is determined that the first shutter switch 62 has been released in S108, the flow returns to the processing of S100. When it is determined that the first shutter switch 62 is being pressed in S108, the flow returns to the processing of S107.

When it is determined that the second shutter switch 63 has been pressed in S107, the system controller 50 captures an image under the first capturing condition (S109). The image data (image captured without a light emission by a light emitter) captured under first capturing condition is cut out with a rectangular shape in accordance with the panning direction by the image processor 24 and synthesized with the end of the synthesized image obtained by the previous capturing (S110) and stored in the memory 32. Details of a cutout of the image data and the synthesizing processing (panoramic synthesizing processing) will be describe later.

Next, the system controller 50 detects an angle of the digital camera 100 (S111), and determines, based upon the angle of the camera detected in S111, whether the camera angle is the reference angle (S112).

When it is determined that the angle of the digital camera 100 is not the reference angle in S112, the system controller 50 determines whether the panning has been ended based upon the angle of the digital camera 100 detected in S111 (S113).

Determining whether the panning has been ended is based upon determination results in two directions, i.e., the panning direction and the direction vertical to the panning direction. The determination in the panning direction may use a method of determining whether an angle increases in the panning direction by comparing the angle of the digital camera 100 just after capturing with the angle of the digital camera 100 one frame before it. The determination in the direction vertical to the panning direction may use a method of determining whether a difference between the reference angle of the digital camera 100 and the angle of the digital camera 100 just after capturing is larger than the predetermined angular threshold.

When it is determined that the panning has been ended in S113, the system controller 50 informs the display unit 28 of a failure of the photography (S114) and the flow returns to the processing of S100. When it is determined that the panning is being performed in S113, the system controller 50 returns to the processing of S109 and captures an image under the first capturing condition. The consecutive shooting is performed during panning until an image is captured under the second capturing condition is done by repeating processing from S109 to S113.

When it is determined that the camera angle is the reference angle in S112, the system controller captures an image under the second capturing condition (S115). Since the second capturing condition of this embodiment uses flashlight, the flash photography is made at this timing. The panoramic synthesizing processing is applied by the image processor 24 to the image data (image captured with a light emission by a light emitter) captured under the second capturing condition (S116), and the resultant data is stored in the memory 32.

Next, the system controller 50 detects the angle of the digital camera 100 (S117), and determines, based upon the angle of digital camera 100 detected in S117, whether the angle of digital camera 100 reaches the panning end angle (S118). When it is determined that the angle of digital camera 100 reaches the panning end angle in S118, the processing of this capturing mode ends.

When it is determined that the angle of digital camera 100 has not reached the panning end angle in S118, the system controller 50 determines whether the panning has been completed based upon the angle of digital camera 100 detected in S117 (S119). The processing of S119 is similar to S113.

When it is determined that the panning is continuing in S119, the system controller 50 captures an image under the first capturing condition (S120), and executes the panoramic synthesizing processing by the image processor 24 (S116), and the flow returns to the processing of S117. The consecutive shooting is performed from capturing an image under the second capturing condition to the end of the photography by repeating the processing from S116 to S120.

When it is determined that the panning is completed in S119, the processing of this capturing mode ends. Since this embodiment completes capturing an image under the second condition which captures the main object even when the panning is not made up to the panning end angle, the synthesized image data is generated but the flow may be returned to S100 by informing the failure of the photography as in S114.

Next follows a description of details of the cutout of the image data. Referring now to FIGS. 4A-4D, a description will be given of the cutout area (image range) of the image data captured under the first and second capturing conditions. A hatched area in FIGS. 4A-4D illustrates a cutout (obtained) area of image data, and a black arrow in FIGS. 4A-4D indicates a panning direction.

FIG. 4A illustrates an effective image area of the image-pickup unit 22 where $W_v$ denotes the number of effective pixels in the horizontal direction, and $H_v$ denotes the number of effective pixels in the vertical direction. FIG. 4B illustrates a cutout area in the image data, where $W_{crop}$ denotes the number of cutout pixels in the horizontal direction and $H_{crop}$ denotes the number of cutout pixels in the vertical direction.

FIG. 4C illustrates the cutout area of the image when the panning is made in the horizontal direction. $W_v > W_{crop}$ is satisfied for the cutout of the image data in the horizontal direction, and $H_v = H_{crop}$ is satisfied for the cutout of the image data in the vertical direction.

FIG. 4D illustrates the cutout area of the image when the panning is made in the vertical direction. $H_v = H_{crop}$ is satisfied for the cutout of the image data in the horizontal direction, and $W_v > W_{crop}$ is satisfied for the cutout of the image data in the vertical direction.

The cutout area of the image data captured under the first capturing condition may be different for each image data. The image data may have a broader cutout area when the panning starts or end so as to widen an angle of view. The first and second capturing conditions may have different (variable) cutout areas (image ranges) of the image data. A method of determining the cutout area of the image data is determined, for example, by a difference between the angle of the camera just after capturing and the angle of the camera one frame prior to it.

The memory capacity can be saved by cutting the image data in this way and by storing the image data area necessary for the panoramic synthesizing processing.

Next follows a description of the synthesizing processing. The system controller 50 reads the image data out of the memory 32, which has been captured under the first and second capturing conditions, cut out, and stored.

Next, the system controller 50 detects a positional offset between the captured images. The detection of the positional offset may use a method of dividing an image into small blocks of an arbitrary size, by calculating a corresponding point at which a sum of an absolute difference ("SUM") of the brightness becomes minimum for each small block, and by finding a motion vector. The present invention is not limited to this method, and may utilize angular velocity information or positional information detected by the detector 80.

Next, the system controller 50 calculates a mapping parameter from the calculated motion vector, corrects the positional offset, and synthesizes an overlap between the images through weighted addition. The image data captured with a light emission by a light emitter under the second capturing condition is synthesized, for example, by using a method disclosed in Japanese Patent No. 4,716,182 so as to set appropriate brightness to each of the object which the emitted light reaches and the background which the emitted light does not reach.

FIGS. 5A-5F illuminate a processing flow according to this embodiment and a relationship with the image data. FIGS. 5A-5F illustrate night views in which a dot-hatched area denotes a bright area, such as illumination, and a line-hatched area denotes a cutout area of the image data.

Figure 5A:
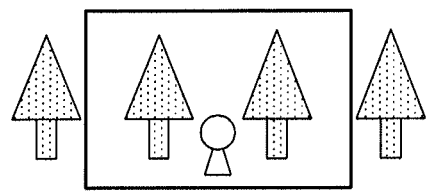
FIGS. 5A-5F illustrate a corresponding relationship between a processing flow and image data according to the first embodiment of the present invention.
Figure 5B:
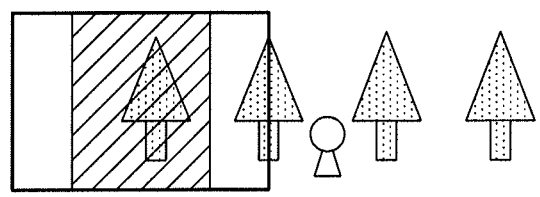
Figure 5C:
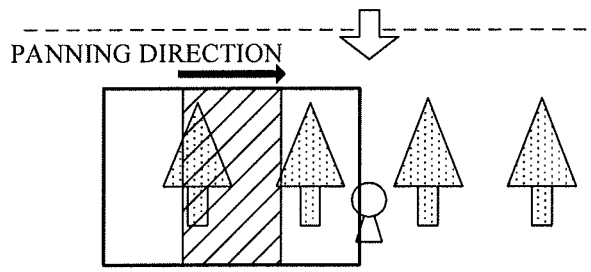
Figure 5D:
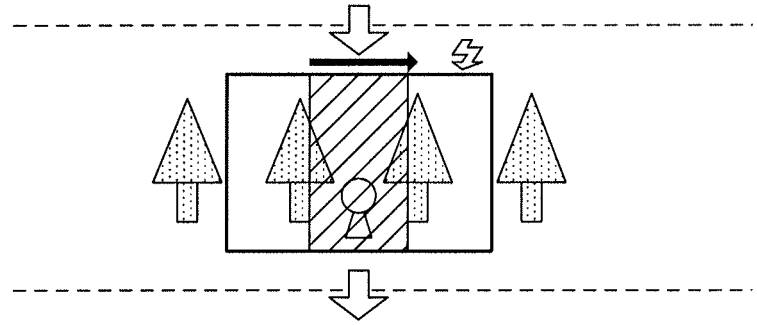
Figure 5E:
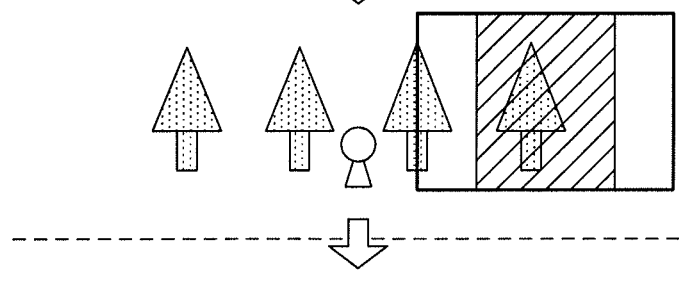
Figure 5F:
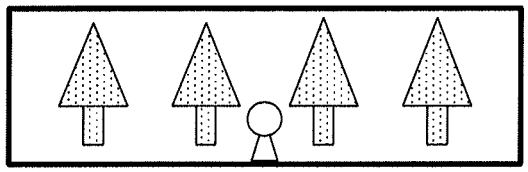

FIG. 5A illustrates a position at which the first shutter switch 62 is pressed. FIG. 5B illustrates a position at which the second shutter switch 63 is pressed. FIG. 5C illustrates consecutive shooting under the first capturing condition during panning. FIG. 5D illustrates a position at which an image is captured under the second capturing condition. FIG. 5E illustrate a consecutive shooting end position with panning up to the set angle. FIG. 5F illustrates a panoramically synthesized image.

The first embodiment illustrates processing of generating a panoramic image in the night view portrait, but is applicable to processing of generating a panoramic image in a backlit portrait. The first embodiment is applicable to processing of capturing at a first capturing instruction position by changing the exposure, and of generating a panoramically synthesized image in which the first capturing instruction position is HDR-synthesized. In other words, which of the first and second capturing conditions is to be changed is not limited, and the exposure time (shutter speed), the ISO sensitivity, focus, or the like may be made different. In this case, a parameter obtained based upon AF, AE or a scene determining result may be set as the first capturing condition when the first shutter switch 62 is pressed, and a parameter may be set as the second capturing condition when the second shutter switch 63 is pressed.

Second Embodiment

The second embodiment illustrates a method for determining a cutout area (image range) of the image data captured under the second capturing condition using a face size detected by the face detector in the panning panoramic synthesizing processing. A description similar to the first embodiment, such as the structure of the apparatus, will be omitted, and only feature processing will be described.

The processing according to the second embodiment is similar to the processing of the first embodiment except the cutout area of the image data captured under the second capturing condition.

Figure 6A:
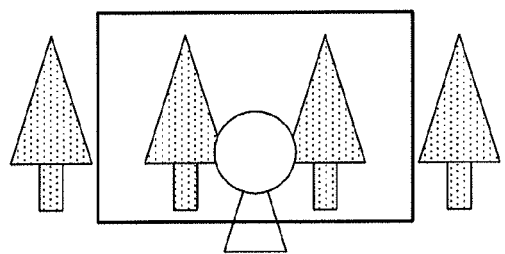
FIGS. 6A-6C illustrate a cutout area of image data captured under a second capturing condition according to a second embodiment of the present invention.

As illustrated in a waist shot (which frames a part above a waist of a person) in FIG. 6A, assume image data captured under the second capturing condition in which a human face is widely captured.

Figure 6B:
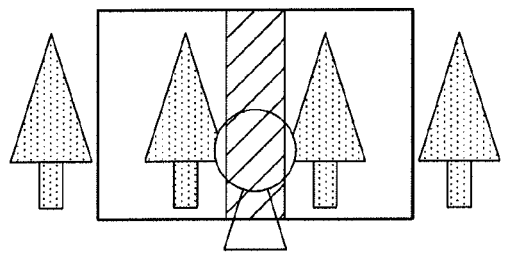

When the cutout area of the image data captured under the second capturing condition is narrower than a human face size as illustrated in FIG. 6B, an image captured with a light emission by a light emitter and an image captured without a light emission by the light emitter are mixed with each other in the human face area in the panoramically synthesized image.

Accordingly, the face detector detects a face size for a through-the-lens image when the first shutter switch 62 is pressed or the image data captured under the second capturing condition, and the cutout area of the image captured under the second capturing condition is determined in accordance with the position and size of the detected face.

Figure 6C:
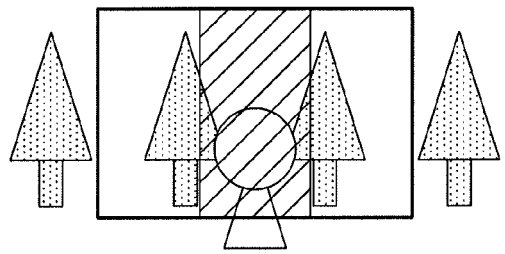

FIG. 6C illustrates an illustrative determination of the cutout area of the image data captured under the second capturing condition in accordance with the face size detected by the face detector. As illustrated in FIG. 6C, the size of the cutout area of the image data captured under the second capturing condition is determined so that the face area detected by the face detector can be entirely contained in the horizontal and vertical directions.

This configuration can prevent a face area of a person from containing an image with a light emission by a light emitter and an image without a light emission by the light emitter by determining a cutout area of the image data captured under the second capturing condition in accordance with the face size detected by the face detector.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the above embodiments detect a reference angle using an angular speed detector or displacement detector in detecting a capturing position under the second capturing condition and detect the angle at the capturing time, but the present invention is not limited to these embodiments. In other words, a reference image as a reference may be captured at a current position instead of storing the reference angle in S106, and it may be determined in S112 whether the current position reaches the reference position through matching between the current captured image and the reference image. When the matching degree between the captured image and the reference image satisfies the predetermined condition in S112, the image may be captured under the second capturing condition. Thus, the object to be captured under the second capturing condition can be properly detected and captured.

In addition, the reference object distance may be measured and recorded at the current position instead of storing the reference angle in S106, and the current object distance may be detected in S112. When the current object distance is equal to the reference object distance in S112, an image can be captured under the second capturing condition. This configuration can properly detect the object to be captured under the second capturing condition and capture the object.

As described above, the reference position information used for capturing an image under the second capturing condition and a reference position determining method of determining whether it is the reference position at the capturing time are not limited and a plurality of pairs are conceivable.

The present invention can generate a high-quality synthesized image in the panning panoramic synthesis.

The present invention can be suitably used for image-pickup apparatuses such as a digital camera and a video camera configured to provide consecutive shooting during panning. Moreover, the present invention is not limited the image-pickup apparatus, such as a digital camera, but is applicable to an arbitrary apparatus that can house or is connected to an image-pickup apparatus such as a cellular phone, a (laptop type, desktop type, or tablet type) personal computer, and a gaming machine. Hence, the "image-pickup apparatus" used in this specification intends to cover an arbitrary electronic apparatus equipped with an image-pickup function.

Another Embodiment

The object of the present invention can also be achieved as follows: A storage medium configured to record a program code of software in which procedures for realizing the above embodiments are described is supplied to a system or an apparatus. A computer (or a CPU or MPU) of the system or apparatus reads and executes a program code stored in the storage medium.

In this case, the program code read out of the storage medium will achieve a novel function of the present invention, and the storage medium that stores the program code and the program will constitute the present invention.

The storage medium configured to supply the program code includes, for example, a flexible disk, a hard disk, an optical disk, and a magnet-optical disk, etc. A CD-ROM, a CD-R, a CD-RW, a DVD-ROM, a DVD-RAM, a DVD-RW, a DVD-R, a magnetic tape, and a nonvolatile memory card, and a ROM, etc. can also be used.

The function of each embodiment is achieved by making feasible the program code read by the computer. In addition, an operating system ("OS") or the like that runs on the computer partially or wholly may execute actual processing based upon the instruction of the program code and the processing achieves the function of each embodiment.

The following case is also included. A program code read out of the recording medium is written in a function expanding board inserted into a computer or a memory of a function expanding unit connected to the computer. Thereafter, a CPU etc. of the function extension board or the function enhancing unit executes part or all of actual processing in accordance with the instruction of the program code.

This application claims the benefit of Japanese Patent Application Nos. 2013-125342, filed on Jun. 14, 2013 and 2012-167788, filed on Jul. 27, 2012, which are hereby incorporated by reference herein in their entirety.

What is claimed is:

1. An image-pickup apparatus configured to provide consecutive shooting, comprising:
    an image-pickup unit configured to capture an object image;
    a synthesizer configured to synthesize a plurality of images captured by the image-pickup unit;
    a detector configured to detect positional information of the image-pickup apparatus;
    a first instructor configured to instruct a start of a photography preparing operation;
    a second instructor configured to instruct a start of a photographic operation; and
    a controller configured to determine a first capturing condition and a second capturing condition in accordance with an instruction from the first instructor and to hold reference position information based upon the positional information detected by the detector when the first instructor provides an instruction, the controller being configured to make the image-pickup unit start the consecutive shooting under the first capturing condition in accordance with an instruction from the second instructor, and to make the image-pickup unit capture an image under the second capturing condition when the detector detects that the positional information of the image-pickup apparatus corresponds to the reference position information.

2. The image-pickup apparatus according to claim 1, further comprising a light emitter configured to emit light to an object, wherein the controller makes the light emitter emit when the positional information of the image-pickup apparatus corresponds to the reference position information.

3. The image-pickup apparatus according to claim 2, wherein the first capturing condition does not make the light emitter emit the light, and the second capturing condition makes the light emitter emit the light.

4. The image-pickup apparatus according to claim 1, wherein the detector is a gyro detector, and an angle of the image-pickup apparatus is detected as the positional information based upon an output value of an angle or an integrated value of an output value of an angular speed of the gyro sensor.

5. The image-pickup apparatus according to claim 1, wherein the detector is an azimuth detector, and an angle of the image-pickup apparatus is detected as the positional information based upon an output value of the azimuth detector.

6. The image-pickup apparatus according to claim 1, wherein the detector uses an image captured by the image-pickup unit as the positional information.

7. The image-pickup apparatus according to claim 1, wherein the detector detects an object distance as the positional information.

8. The image-pickup apparatus according to claim 1, wherein the synthesizer includes a unit configured to make variable an image range obtained from an image captured by the image-pickup unit and used for a synthesis.

9. The image-pickup apparatus according to claim 8, further comprising a face detector, wherein the controller makes the face detector detect a position and size of a face of an object in response to the instruction from the first instructor, and determines the image range used to obtain the image captured under the second capturing condition based upon a detected position and size of the face.

10. An image-pickup method configured to provide continuous photography, the method comprising:

a synthesizing step of synthesizing a plurality of images captured by an image-pickup unit;

a detecting step of detecting positional information of the image-pickup unit;

a first instructing step of instructing a start of a photography preparing operation;

a second instructing step of instructing a start of a photographic operation; and a controlling step of determining a first capturing condition and a second capturing condition in accordance with an instruction from the first instructing step and to hold reference position information based upon positional information detected by the detecting step when the first instructing step provides an instruction, the controlling step making the image-pickup unit start consecutive shooting under the first capturing condition in accordance with an instruction from the second instructing step, and to make the image-pickup unit capture an image under the second capturing condition when the detecting step detects that the positional information of the image-pickup apparatus corresponds to the reference position information.

11. A non-transitory computer-readable storage medium storing a program that enables a computer to execute each step of the control method of the image-pickup apparatus according to claim 10.

* * * * *